UNITED STATES PATENT OFFICE.

GUSTAV KOLLER, OF FOREST GATE, ENGLAND.

CELLULOSE COMPOSITION.

1,079,773.  Specification of Letters Patent.  Patented Nov. 25, 1913.

No Drawing.  Application filed February 8, 1912. Serial No. 676,864.

*To all whom it may concern:*

Be it known that I, GUSTAV KOLLER, a subject of the Emperor of Austria-Hungary, residing at Forest Gate, Essex, England, have invented new and useful Improvements in Cellulose Compositions, of which the following is a specification.

Of the chlorin substitution products of ethane and ethylene (tetrachlorethane also known as acetylene tetrachlorid and having the formula $C_2H_2Cl_4$, pentachlorethane $C_2HCl_5$, dichlorethylene $C_2H_2Cl_2$, trichlorethylene $C_2HCl_3$ and perchlorethylene $C_2Cl_4$) only tetrachlorethane, pentachlorethane and dichlorethylene have been tried or suggested for the purpose of dissolving or manufacturing cellulose compositions (the latter two in conjunction with alcohol) dichlorethylene is the dearest, and, owing to its very low boiling point (55° C.), presents great difficulties to a thorough recovery of the solvent. It also burns.

Tetrachlorethane and pentachlorethane have a very high boiling point (147° C. and 159° C. respectively.) They are however, absolutely non-inflammable, but a very serious drawback has been discovered in the fact that both show a pronounced corrosive action on metals. Delicate machinery, such as is used in the manufacture of films and artificial silk, deteriorates considerably in contact with them.

Trichlorethylene and perchlorethylene are not only non-inflammable, but also indifferent to metals, that is, non-corrosive. Of these two, trichlorethylene possesses the advantages of low price and a boiling point of 88° C. which insures a speedy evaporation of the solvent and at the same time a thorough recovery of same, without any such losses as are unavoidably incurred when dichlorethylene is used. In spite of these favorable features it has not been possible hitherto to utilize trichlorethylene and perchlorethylene in the manufacture of cellulose compositions, because they neither by themselves nor in conjunction with alcohol or camphor yield solutions of acetylized cellulose.

Camphor substitutes such as mono and poly-hydric phenols have been recommended as emollient additions to acetylized cellulose compositions (see British Patent 2264/1902, also British Patent No. 7088 of 1902) and hopes were entertained that films and other products could be produced in that way, which would possess a degree of flexibility and toughness equal to that of celluloid.

Various methods of incorporation of such phenols into known cellulose compositions, or of interaction between such cellulose compositions and phenols have been suggested from time to time. None of these processes have led to products of all-around commercial utility. It appears (see British Patent No. 8945 of 1909, lines 15 to 27) that, although most of the additions suggested will impart at the beginning some flexibility, all the products thus obtained are of very limited industrial applicability, owing to the fact that they are liable to change color or to become brittle when the solvent has been allowed to evaporate.

I have found that new and valuable cellulose compositions result from the interaction of acetylized cellulose derivatives or compositions containing such acetylized derivatives or mixtures of cellulose acetates with other cellulose esters or their solutions with mono or poly-hydric phenols and with trichlorethylene and or perchlorethylene. The new compositions are obtained either in the form of solutions, or as gelatinous and plastic products.

By allowing the solvents to evaporate, materials are obtained which are transparent and possess a high degree of toughness and hardness, and which are superior, as far as flexibility is concerned, to the known cellulose acetate products. They are not liable to change color or to become brittle when the solvent has been allowed to evaporate.

The solutions and the plastic products referred to are particularly suitable for varnishing purposes, for covering or impregnating fibers, fabrics metallic or otherwise, also tissues, leather, wood, paper, straw and the like with impervious, waterproof and lustrous coatings, for producing artificial silk, films, incandescent filaments and pressed or shaped cellulose compositions. They can also be used as a flexible cement, and as an insulating or luting material which will resist the action of strong chemicals and of corrosive gases.

Example A: 2 parts of carbolic acid are dissolved in 20 parts of trichlorethylene, and 1 part of an acetylized derivative of cellulose is added to the solution. Agitation and heating may be resorted to. Clear liquid cellulose compositions are obtained. The solutions can be concentrated to any desired consistence by partial evaporation of the solvent. The cellulose composition can also be precipitated in a gelatinous form in the known way by water, alcohol, benzin, petroleum spirit and other liquids. Precipitation can also be brought about by the addition of an excess of trichlorethylene or perchlorethylene to solutions obtained in the way described.

Example B: 1 part of an acetylized derivative of cellulose is mixed or ground with 2 parts of carbolic acid and then treated with 20 parts of perchlorethylene, when a new gelatinous product results, forming a separate layer on top of the bulk of the perchlorethylene - phenol solution, from which it can be separated without difficulty. When the separated mass is freed from any excess of liquid absorbed by it, a semi-solid and plastic material remains, which can be pressed and shaped as desired, and which will, after the evaporation of the solvent, yield flexible products of a celluloid-like nature.

I do not confine myself to the particulars given in the above examples which are merely typical, and can be varied within wide limits, without altering thereby the nature of this invention. A mixture for instance of the two chlorin substitution products of ethylene containing more than two atoms of chlorin such as trichlorethylene and perchlorethylene can be used and the proportions of the raw materials can be varied. By doing so it is possible to obtain, as desired, more liquid or rigid solutions.

What I claim is:—

1. The process of treating cellulose esters in the presence of phenols with chlorin substitution products of ethylene containing more than two atoms of chlorin substantially as described.

2. As a new article of manufacture an acetylized cellulose composition containing chlorin substitution products of ethylene having more than two atoms of chlorin and phenols substantially as described.

In witness whereof I have hereunto set my hand in the presence of two subscribing witnesses.

GUSTAV KOLLER.

Witnesses:
  O. J. WORTH,
  C. P. LIDDON.